United States Patent Office 2,704,317
Patented Mar. 15, 1955

2,704,317

SHEATHED WELDING ELECTRODE FOR WELDING OF INTERGRANULAR CORROSION RESISTANT STAINLESS STEEL

Werner Hummitzsch, Hamm, Germany, and Franz Ablasser, Kapfenberg, Austria, assignors to Gebr. Böhler & Co. Aktiengesellschaft, Vienna, Austria No Drawing. Application March 28, 1951, Serial No. 218,074

4 Claims. (Cl. 219—8)

This invention relates to a sheathed welding electrode for welding of intergranular corrosion resistant stainless steels, and is a continuation-in-part of our co-pending application Serial No. 11,856 filed February 27, 1948, now abandoned.

It is known to add niobium to austenitic chrome-nickel steels for the elimination of intergranular corrosion, in the weld, and this in a predetermined ratio to the particular carbon content. Also welding rods have been used for the welding of corrosion-resistant chromium or chrome-nickel steels which consist of homogeneous chromium or chrome-nickel steels with an addition of niobium, the quantity of niobium depending on the particular carbon content of the alloys. There has further been proposed austenitic welding wires for highly resistent welding connections of high endurance under alternate bending which contain as supplementary addition not only niobium but also simultaneously aluminium, manganese, and tantalum.

Also in certain processes it is desirable to avoid niobium burning in welding as much as possible. For example, it has been proposed for this purpose to alloy the welding rods with about 0.7% of silicon or more and also to add to the sheaths of such welding rods silicon in the form of metallic silicon, ferro-silicon, or in the form of other silicon alloys in proportions of from 1 to 50%. Other proposals are to the effect that the niobium must as far as possible be disposed in the sheath and not in the rod, in order thus to avoid excessive niobium burning.

The problem of the warm-crack sensitivity of the welding material, which is especially important in the welding of rust- and acid-resistant steels, has hitherto not been considered in these proposals, although these warm cracks, that is, welding cracks along the austenitic grain boundaries which are formed in cooling from the welding heat while still warm, often make such welding connections useless.

The object of the present invention is to provide welding electrodes which give reliable warm-crack resistant welding connections in the welding of rust- and acid-resistant and grain-decomposition resistant austenitic chrome-nickel steels.

By extensive research we have found that in electrodes for this purpose both the composition of the core wire and the type of sheath thereof are critical, and especially so for the welding of relatively thick sheets, for example, sheets of a thickness of more than 3.5 mm., but in particular more than 5 mm. With respect to the composition of the core wire, it is important that the niobium content be at least 0.9%, while at the same time the manganese content should be at least 0.8%. The silicon content of the core wire must not exceed the upper limit of 0.5%, and it is desirable to keep it as low as possible.

Core wires according to the present invention may therefore consist of up to 0.15% of C, up to 0.5% of Si, 0.6 to 4% of Mn, 14 to 26% of Cr, 2 to 14% of Ni, 0.9 to 10% of Nb, and optionally, up to 6% of Mo and up to 4% of Cu, the remainder being iron with the usual impurities. As shown, the ratio niobium to manganese is preferably in the range of 3:2.

Such core wires must be given a wrapping or sheath which consists in the known manner of lime and which desirably, for the compensation of the manganese and niobium burning in the welding, also contains metallic additions of 1 to 5% of manganese and of 1 to 10% of niobium for example in the form of ferro alloys, as well as up to 20% of silicates.

The silicon content introduced in the welding material is less harmful when it originates from the wrapping or sheath of the welding rods than when it is brought in by the silicon content of the core wire. However, also in the wrapping or sheath material the elementary silicon content must in no case be more than 0.5% if warm cracks are to be avoided with certainty.

Sheathed electrodes with which warm-crack resistant welds can reliably be made in conformity with the present invention on rust- and acid-resistant and grain-decomposition resistant chrome-nickel steels have for example the following core-wire and wrapping compositions:

1. Core wire: 0.10% C, 0.4% Si, 1.5% Mn, 19.7% Cr, 8.9% Ni, 4.5% Nb, remainder iron with the usual impurities.
   Wrapping: 45% CaF₂, 40% CaCO₃, remainder silicates.

2. Core wire: 0.09% C, 0.35% Si, 1.1% Mn, 19.1% Cr, 9.5% Ni, 3.8% Nb, remainder iron with the usual impurities.
   Wrapping: 43% CaF₂, 38% CaCO₃, 4% ferromanganese (80-percentual), 6.5% ferroniobium (60-percentual), remainder (about 8.5%) silicates.

What we claim is:

1. A sheathed electrode for the production of warm-crack resistant welds on rust-, acid-resistant and intergranular corrosion resistant chrome-nickel steels, comprising a core wire consisting of carbon up to 0.15%, silicon up to 0.50%, manganese 0.6 to 4%, chromium 14 to 26%, nickel 2 to 14%, niobium 0.9 to 10%, the niobium being present in relation to the manganese in the approximate ratio of 3 to 2 the remainder iron with the usual impurities and a sheath comprising lime and fluorspar in substantial proportion and the remainder, silicates up to about 20%.

2. A sheathed electrode for the production of warm crack resistant welds on rust, acid-resistant and intergranular corrosion resistant chrome-nickel steels, comprising a core wire consisting of carbon up to 0.15%, silicon up to 0.50%, manganese 0.6 to 4%, chromium 14 to 26%, nickel 2 to 14%, niobium 0.9 to 10%, the remainder being iron with the usual impurities, and a sheath comprising substantially lime and fluorspar containing 1 to 5% of manganese and 1 to 5% of niobium, and the remainder, ranging from about 8.5 to 20% silicates.

3. A sheathed electrode for the production of warm crack resistant welds on rust, acid-resistant and intergranular corrosion resistant chrome-nickel steels, comprising a core wire consisting of approximately 0.1% C, approximately 0.4% Si, approximately 1.5% Mn, approximately 19.7% Cr, approximately 8.9% Ni, approximately 4.5% Nb, the remainder being iron with the usual impurities, and a sheath comprising substantially lime and fluorspar containing 1 to 5% of manganese and 1 to 5% of niobium, and up to 20% of silicates.

4. A sheathed electrode for the production of warm crack resistant welds on rust, acid-resistant and intergranular corrosion resistant chrome-nickel steels, comprising a core wire consisting of approximately 0.09% C, approximately 0.35% Si, approximately 1.1% Mn, approximately 19.1% Cr, approximately 9.5% Ni, approximately 3.8% Nb, the remainder being iron with the usual impurities, and a sheath comprising approximately 43% CaF₂, approximately 38% CaCO₃, approximately 4% of an 80% ferromanganese, approximately 6.5% of a 60% ferroniobium, the remainder being silicates.

References Cited in the file of this patent

UNITED STATES PATENTS

| | | |
|---|---|---|
| 2,011,706 | Blumberg | Aug. 20, 1935 |
| 2,067,631 | Beckert | Jan. 12, 1937 |
| 2,219,462 | Wissler | Oct. 29, 1940 |

FOREIGN PATENTS

| | | |
|---|---|---|
| 459,366 | Great Britain | Jan. 4, 1937 |
| 459,367 | Great Britain | Jan. 4, 1937 |